United States Patent Office 3,448,286
Patented June 3, 1969

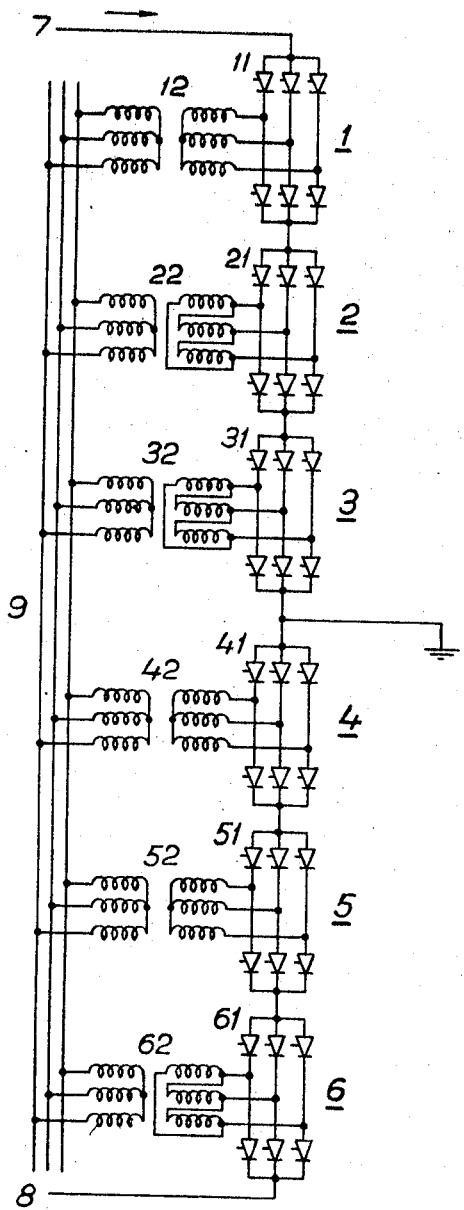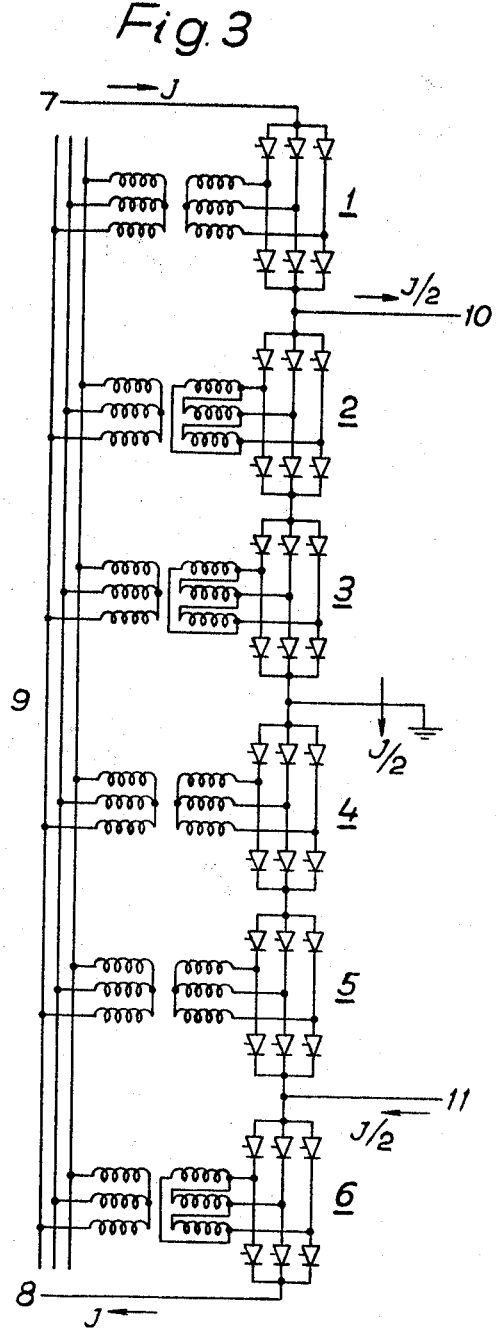

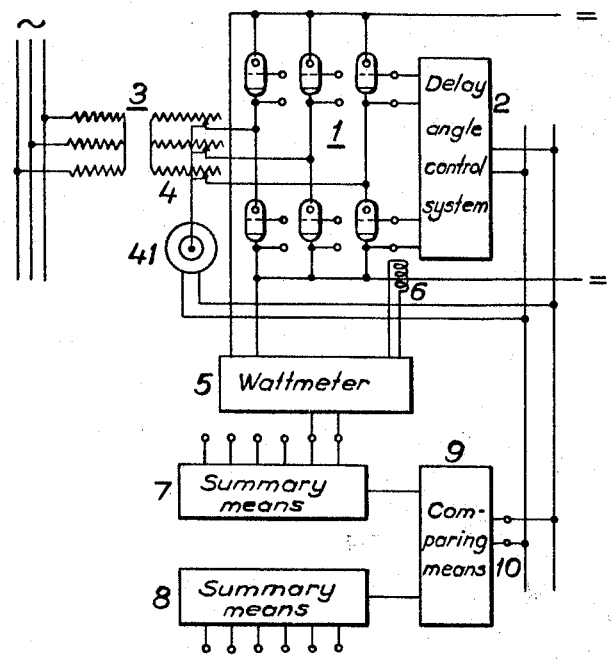

3,448,286
BALANCING OF HARMONICS AT CONVERTER STATIONS IN ASYMMETRICAL WORKING
Hans A. Stackegard, Ludvika, Sweden, assignor to Allmänna Svenska Elektriska Aktiebolaget, Vasteras, Sweden, a corporation of Sweden
Filed Oct. 22, 1964, Ser. No. 405,740
Claims priority, application Sweden, Oct. 31, 1963, 11,989/63
Int. Cl. H02j 1/14
U.S. Cl. 307—82  2 Claims

ABSTRACT OF THE DISCLOSURE

In a static converter station comprising a plurality of converters, the converters are arranged with different phase positions in relation to an A.C. network connected to the station. The converters are divided in groups each with its own phase position. The total power is summed up within the different groups and the difference between the totals of power influences the controlling means of the converters of the different groups so that said totals of power for the different groups are equalized as much as possible.

It is a further object of the invention to limit said harmonics even in the case of asymmetric operation in such a converter station.

---

The invention relates to a converter station with a high pulse number comprising a number of converters whose A.C. sides are connected in parallel to an A.C. network and in which converter station the converter transformers for the different converters are groupwise mutually phase displaced in groups and the invention has the purpose of limiting the harmonics coming up in such a converter station.

As is known, a static converter gives rise to a number of harmonics in the A.C. network to which the converter is connected and these harmonics are dependent on the pulse number of the converter in such a way that a converter with the pulse number $p$ gives rise to harmonics with the number $n=kp\pm1$, where $k$ is an arbitrary whole number. A 6-pulse converter, for example, therefore gives rise to harmonics of 5th, 7th, 11th, 13th, 17th, 19th, etc., numbers. Unless the rated output of the converter is negligible in relation to the total power of the network, these harmonics must be damped with the help of a filter which represents a considerable cost in conjunction with a static converter plant. In order to reduce the number of harmonics in a converter station and thereby the costs of the filters for the station, it is usual in a converter station with several converters each with its own converter transformer to phase displace these converter transformers in relation to each other. If, for example, one thinks of a converter station build up of two constituent converters each with the pulse number 6, the corresponding converter transformers could suitably be coupled in Y-connection on the one side, while the other side for the one transformer is Y-connected and for the second D-connected. It can be proved that in this case the harmonics of order 5, 7, 17, 19, and so on from the two converters have opposite signs and thus compensate each other so that the resultant pulse number for the whole converter station is increased to 12, whereby the harmonics are limited to the 11th, 13th, 23rd, 25rd, etc. In the same way the pulse number 24 may be obtained with larger numbers of converters and so on. The relation described here assumes, however, a symmetrical build-up and working of the converter station. Imagine, for example a converter station comprising an even number of converters divided into two groups, whose transformers are mutually phase displaced and imagine that a converter in one of the groups is disconnected because of a fault in it, the converter station becomes unbalanced in respect of its harmonic balancing, and harmonics corresponding to the pulse number in the disconnected converter and with a power proportional to the corresponding power of the converter occur in the converter station and thereby in the alternating current network connected thereto.

In previously known converter stations where the different converters have had common voltage and current regulation, the above described drawback has been tolerated as unavoidable, especially as in symmetrically built up converter stations it only came up upon a fault in one of the converters. Later, however, it has been found desirable to give up the symmetrical construction or operation of a converter station, whereby the balancing of the harmonics according to previously known methods was impossible.

In order to obtain a balancing even in such cases, it is proposed according to the present invention to supply each of the different converters with its own current and voltage regulation of known type, while at the same time the converter station is supplied with an arrangement for coordinating the adjusting of current and voltage regulation in the different constituent converters in such a way that the total power for the different groups of converters even during asymmetrical operation of the station are as similar to each other as possible within the fixed control limits. If the total power is the same in the two groups of converters with different phase positions, then the total power of the harmonics coming from the two groups will also be the same and those which have opposite signs, that is 5, 7, 17, 19 and so on, will eliminate each other.

The two control possibilities in a converter generally consist in, on the one hand, a regulation of the A.C. voltage connected to the rectifier connection of the converter which regulation can be carried out by means of a tap selector on the coverter trasformer. The other control possibility is a regulation of the control or delay angle of the rectifiers of the conveters by means of the grid control system for the rectifiers. In both cases the direct voltage of the converter is controlled in relation to the direct voltage of D.C. line connected to the converter and the difference between said two direct voltages determined the direct current of the converter. As the regulation of the delay angle is a very rapid control system, this is normally connected to a current regulator for the converter determining a desired current in the converter, while the A.C. regulation by means of a tap selector is rather slow and could be carried out manually or with some kind of control system. In general, the grid control is used for current regulation while the A.C. voltage regulation is used for voltage regulation of the converter. For both these regulation possibilities certain limits are given for a tap selector for example, an interval of some ten percent and for a rectifier a certain desired minimum delay angle and for an inverter a minimum permissible commutation margin. Likewise, with regard to the desire to keep the reactive powers at a converter station below a certain amount, it is unsuitable to decrease the direct voltage of the converter too much. Because of this it is not always possible to reach complete balance of the lower harmonics araising from an asymmetrical operation of the station, but every decrease in the power of the harmonics decreases the demands for the dimensions of the necessary harmonic filter for the station, so that even a partial balancing according to the invention can involve a considerable saving in the filter costs.

The said balancing possibilities can be improved by a further development of the invention according to which converters with different phase positions are divided in a suitable way between groups of converters arranged between intermediate D.C. tappings in the converter station. The object is in the choice of phase position for the different converters that the total power of the converters with one phase position as near as possibly equal to the total power of the converters of another phase position during as much of the operation as possible. In this case, the number of distribution possibilities of converters as well as the number of different operations are quite limited, so that it is always possible for an actual converter station by analysis to find out according to the above mentioned guide lines, which distribution of the converters is most favourable. Such a choice of phase combinations is in itself always of value particularly as it does not involve any extra cost in construction, but combined with the main idea of the invention a suitable distribution of the converters often means that complete balancing of the lower harmonics can be obtained with moderate operating steps in the control system of the converters.

The invention will be more described in detail with reference to the attached schematic drawings, where FIGURES 1 and 3 show different examples of converter connections, while FIGURE 2 indicates schematically a control system according to the invention.

FIGURE 1 shows a converter station comprising a number of constituent converters 1–6, connected in series between two D.C. lines 7, 8 and parallel connected to an A.C. network 9. Two of the converters 1 and 2, are shown more in detail comprising a rectifier bridge 11, 21 respectively and a converter transformer 12, 22 respectively. It is seen that transformer 12 is Y/Y-connected while transformer 22 is Y/D-connected. The other converters, 3–6, are built up in the same way comprising a converter transformer and a rectifier bridge. Each converter comprises a rectifier group 11, 21, etc., and a converter transformer 12, 22, etc., which components ae shown more in detail in FIG. 5. Further the D.C. side of each converter is parallel connected with a by-pass connecting means 13, 23, etc., normally made as an isolator. The network sides of the converter transformers are all connected in the same way, for example in Y-connection, while the rectifier sides of the transformers are connected as shown, that is, for the converters 1, 4 and 5, the rectifier sides of the transformers are Y-connected, while in the remaining converters the rectifier sides of the transformers are D-connected. In this way the A.C. voltages connected to the rectifiers in the two kinds of converters are displaced 30° in relation to each other which means that harmonics of the orders 5, 7, 17, 19 and so on will have opposite sign in the two groups of converters so that if there is power balance between the two groups said harmonics will compensate each other. During normal operation the station is wholly symmetrically loaded and the current in the earth-connected centre tap is zero. Not considering this centre tap, the different converters are simply series connected on the D.C. side and the direct current must always be the same in these converters. On the other hand it is possible by controlling the tap selector of the different converter transformers to change the alternating voltage of the converters. In this way it is possible to variate the direct voltage distribution along the chain of series connected converters 1–6.

If, for example, the converter 6 is disconnected, for instance by short circuiting its D.C. side, the power from the converters with Y-connected rectifier windings will be greater than the power from the converters with D-connected rectifier windings. As mentioned, it is not possible to change the current in the series connected converters in relation to each other, whereas it is possible by switching the tap selectors of the converter transformers to change the alternating voltage of the converters. For complete power balancing in this case the voltage in the converters 1, 4 and 5 must be decreased to ⅔ of the voltage in the converters 2 and 3 so that the power is equal in said two groups of converters. So large a control range for a transformer is not usual, but even a smaller regulation can be of value. If, for example, the control range is 10% in each direction for each converter transformer and the normal voltage over a converter is called D, the total voltage for both the two D-connected converters 2 and 3 will be 2.2 D at maximum regulation on the transformers, while the total voltage for the three Y-connected converters 1, 4 and 5 will be 2.7 D. As the currents in the converters are equal, the power of the converters corresponds to the mentioned voltages, whereas the difference in the total power of the two groups of constituent converters will correspond to half of the normal power for one converter. By means of the described control step the power of the lower harmonics corresponding to the pulse number in one converter is halved.

Without current in the centre tapping and the earth return conductor it is consequently possibly partly to reach a balancing of the lower harmonics. By making use of the possibility also to use the centre tap to the earth as a third conductor a complete balancing of the lower harmonics can be reached. In the said case when the converter 6 is disconnected, the current in the direct current conductor 7 could be doubled in relation to the conductor 8. The current in the centre tap then becomes equal to the current in the conductor 8 and the earth return conductor forms a parallel conductor to conductor 8.

Now the power of each of the two Y-connected converters 4 and 5 becomes half of the power in the converters 1, 2 and 3 and the total power of the two D-connected converters 2 and 3 will be the same as the total power of the three Y-connected constituent converters 1, 4 and 5, at even voltage division, for which reason the harmonics corresponding to the pulse number of one converter will be completely compensated. The control of power of the different converters in order to obtain power balance between the groups of converters with different phase position will be better understood from FIGURE 2.

In FIGURE 2 it is shown schematically how an arrangement for coordination and balancing of the total power for two groups of constituent converters with mutually different phase positions can be built up. On the figure only is shown one constituent converter comprising a valve group 1 with grid control system 2 connected to the grids of the rectifiers which system determines the delay angle of said rectifiers of the constituent converter and a converter transformer 3 with tap selector 4, controlled in one direction or the other by a motor 4¹.

The power of the constituent converter is measured by means of a wattmeter 5 connected to direct current tappings on both sides of the rectifier group 1, and to a measuring transductor 6 inserted in a direct current conductor. The measured power value of the wattmeter 5 is supplied on a summary member 7, where it is summed together with the power value from all the other constituent converters in the station with the same phase position. The power values from constituent converters with another phase position are brought to another summary member 8 to be summed. Both the total powers are brought to a comparing member 9, from whose output terminals 10 a signal is obtained, whose magnitude and potential correspond to the difference between said two total powers and which signal is the determining factor for the controlling of the constituent converters and is fed to the grid control system 2 and the motor 4¹ for the tap selector 4.

Thus if the total power for one group of converters exceeds that of the other group a signal with a certain magnitude and sign will be delivered to the tap selectors and delay control systems of the converters of the two groups.

In the first group, this signal will influence said two control means so that said two means each in its own way will try to reduce the direct voltage of the converters of the group while in the other group the direct voltage of the converters is increased. The result will be an equalizing of the total power of the two groups.

It is clear that the signal from the comparing means 9 corresponds to the difference between said two total powers and which signal must be subordinated to the other signals to the control members of the converters and above all subordinated to the limits required for safe operation. This means that the superior control signals must first be respected but an analysis of the function of the station in different operations shows that generally some and sometimes total compensation of the lower harmonics is possible through the invention.

In FIGURE 3 is shown a converter station I with the same number of converters as those previously shown, and whose outer D.C. terminals are connected to two D.C. lines 7 and 8. Further, the station I is provided with D.C. taps between the outer and next to the outer converters, to which taps two D.C. lines 10, 11 with lower potential than the aforementioned are connected. Such a construction is for example feasible in a transmission where a distant power supply is arranged to feed the station I and another station II connected to the lines 10 and 11. With a current distribution and an arrangement of the converters as shown, it is seen that the parts of the station I on each side of the centre tap are balanced out with reference to Y and D connected converters, whereby even with unipolar operation, that is, when only the part of the station on the one side of the centre tap is in operation, the lower harmonics are balanced through the arrangement of the converters. Even if the conditions deviate somewhat from the even current distribution shown between, for example, the D.C. conductor 11 and the converters 4 and 5, it is seen that the arrangement of the phase position of the converters shown in any case gives a certain equalisation of the ratio between the converters of one phase position and converters of another phase position.

A converter station can in certain cases be connected to a number of A.C. machines whereby it may be suitable to connect the converters in pairs to the different A.C. machines. This may be the case for instance when a number of synchronous machines are connected to the station in order to provide it with reactive power. Even a number of generators could be connected to the station for supplying of the constituent converters in pairs. In such a case it is according to the invention suitable that two converters connected to one machine have different phase positions, whereby disconnection of a machine with the converters belonging to it does not give any change in the pulse number of the station and thereby no increase in the number of harmonics.

Recently it has been proposed to build up a converter station of several, for example, two parallel chains of converters. Such a station can have a performance as shown in FIGURE 4 which mainly constitutes a parallel connection of two stations according to FIGURE 1. If a fault in a converter in one chain occurs, so that that converter is by-pass connected, the voltage in the second chain must be lowered in a corresponding way. With faults of short duration, this will be accomplished through grid control of the parallel chain. As this gives an increased reactive power, it is desired with faults of longer duration, that is, when it is not possible to reconnect the faulty converter, to disconnect a converter in the other chain. By this means according to the invention the converters in both the chains should be so coordinated that disconnection of a converter with one phase position in the one chain causes disconnection of a converter with another phase position in the second chain. In this way the disconnection of the converters gives no change in the pulse number of the station. The assumption is, however, that the currents in both the parallel chains are equal. In FIG. 4 by-pass connecting means formed like isolators are shown for the converters and it is shown how the isolators of the two claims are pairwise connected.

In FIGURE 2 it is shown schematically how an arrangement for coordination and balancing of the total power for two groups of converters with mutually different phase positions can be constructed. In the figure is shown only one converter comprising a valve group 1 with grid control system connected to the grids of the rectifiers 2 which determines the delay angle of said rectifiers of the converter and a converter transformer 3 with tap selector 4, controlled in one direction or the other by a motor 41. The power of the converter is measured by means of a wattmeter 5 connected to direct current taps on both sides of the rectifier group 1, and to a measuring transductor 6 inserted in a direct current conductor. The measured power value of the wattmeter 5 is supplied on a summary member 7, where it is added together with the power value from all the other converters in the station with the same phase position. The power values from converters with another phase position are brought to another summary member 8 to be added. Both the total powers are brought to a comparing member 9, from whose magnitude and output terminals 10 a signal is obtained, whose potential correspond to the difference between said two total powers and which signal is the determining factor for controlling the converters and is fed to the grid control system 2 and tap selector 4. Such a signal must be subordinated to the other signals to the control members of the converters and above all subordinated to the limits required for safe operation. This means that the superior control signals must first be respected but an analysis of the function of the station in different operations shows that generally some and sometimes total compensation of the lower harmonics is possible through the invention.

I claim:
1. Multiphase converter station comprising a plurality of converters, constituting at least two groups, the A.C. sides of said converters being connected in parallel to an A.C. network, each converter having a converter transformer, said converter transformers of one group being mutually phase displaced, with respect to those of another group each converter comprising adjustable voltage and current regulating means, means for adding the total power of each of the different groups of converters, and means responsive to a difference between the powers of two groups to adjust said voltage and current regulating means in a direction to give as equal values of said total powers as possible, even during asymmetric operation in the converter station.

2. Converter station as claimed in claim 1, said station being provided with a number of D.C. taps, said converters being arranged in groups between said D.C. taps, the direct current of at least some of said groups being different, the converters with different phase positions being distributed between said groups in such a way that the total power of the converters with one phase position is as equal as possible to the total power of the converters with another phase position.

References Cited

UNITED STATES PATENTS

| | | | |
|---|---|---|---|
| 1,990,758 | 2/1935 | Stone | 321—2 X |
| 1,990,759 | 2/1935 | Stone | 321—2 |
| 2,013,454 | 9/1935 | Willis | 321—2 |
| 2,224,645 | 12/1940 | Eichberg | 321—2 X |
| 2,820,189 | 1/1958 | Uhlmann | 321—9 X |

B. DOBECK, *Primary Examiner.*

W. E. DUNCANSON, JR., *Assistant Examiner*